(No Model.) 2 Sheets—Sheet 1.
F. L. PERRY.
SYSTEM OF ELECTRICAL DISTRIBUTION.
No. 408,513. Patented Aug. 6, 1889.
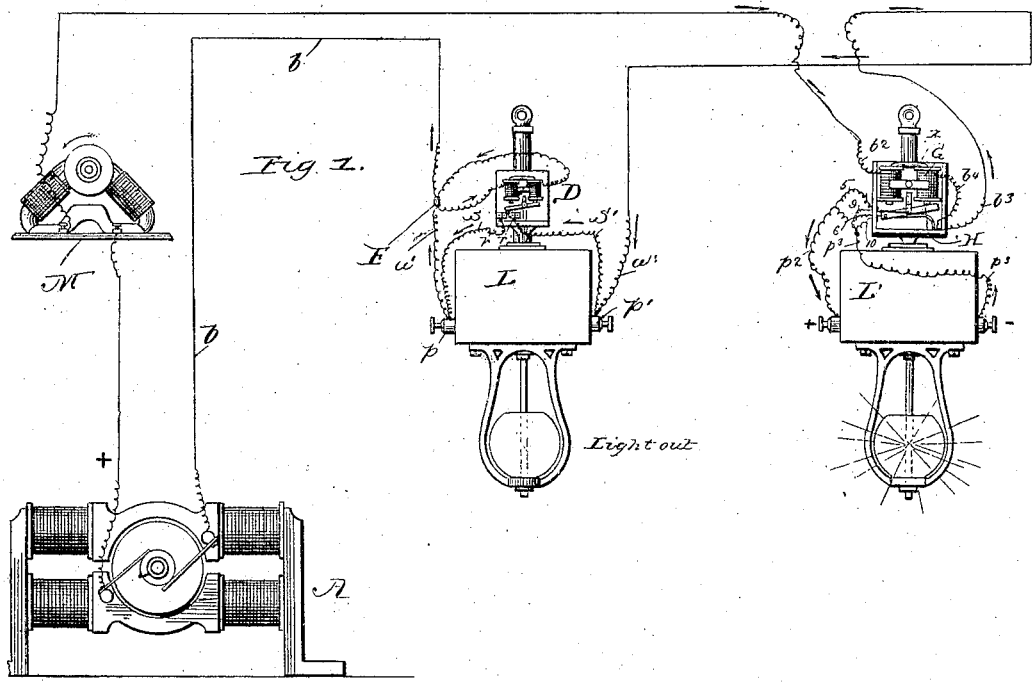
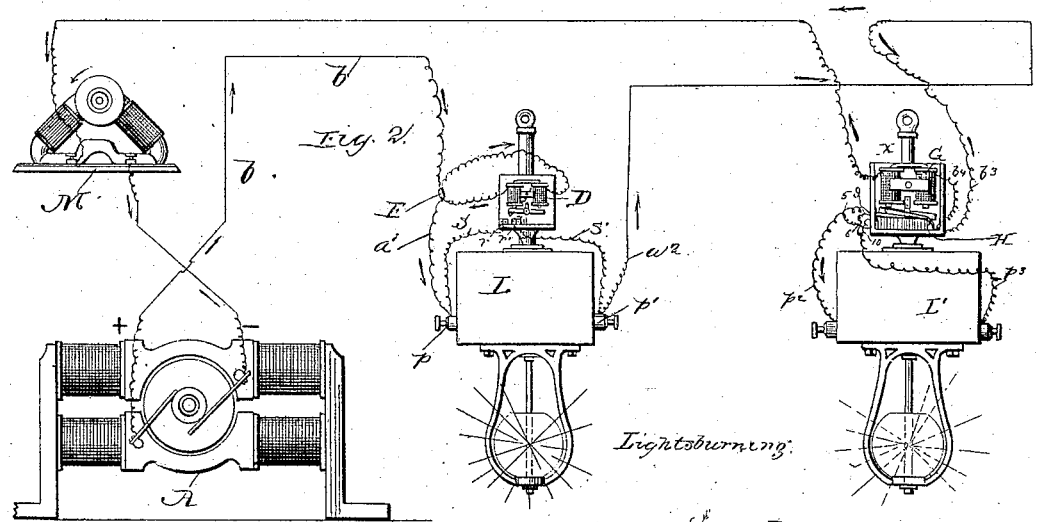
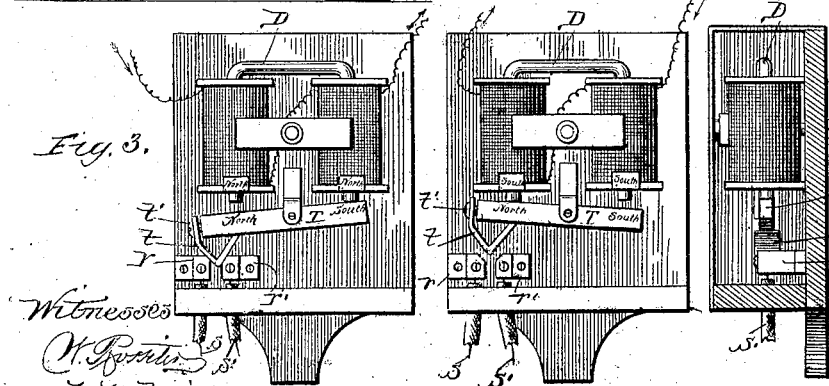
Witnesses
W. Portin
F. H. Mills.
Inventor
Frank L. Perry
By Perie & Fisher
His Atty.

(No Model.) 2 Sheets—Sheet 2.
F. L. PERRY.
SYSTEM OF ELECTRICAL DISTRIBUTION.
No. 408,513. Patented Aug. 6, 1889.
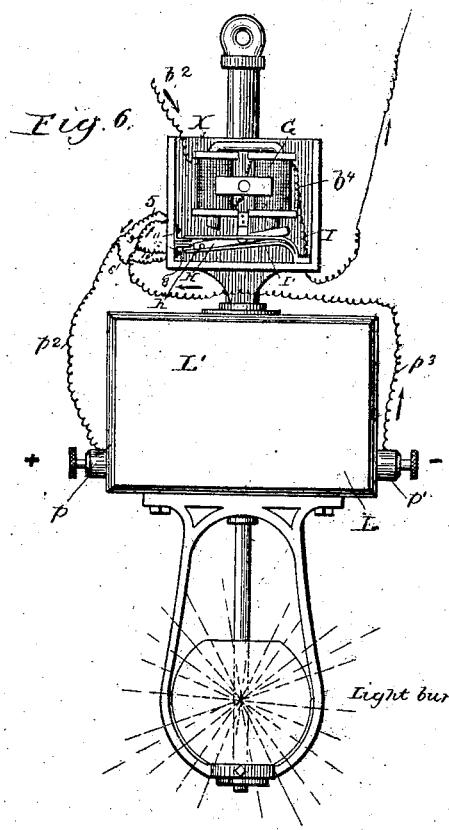
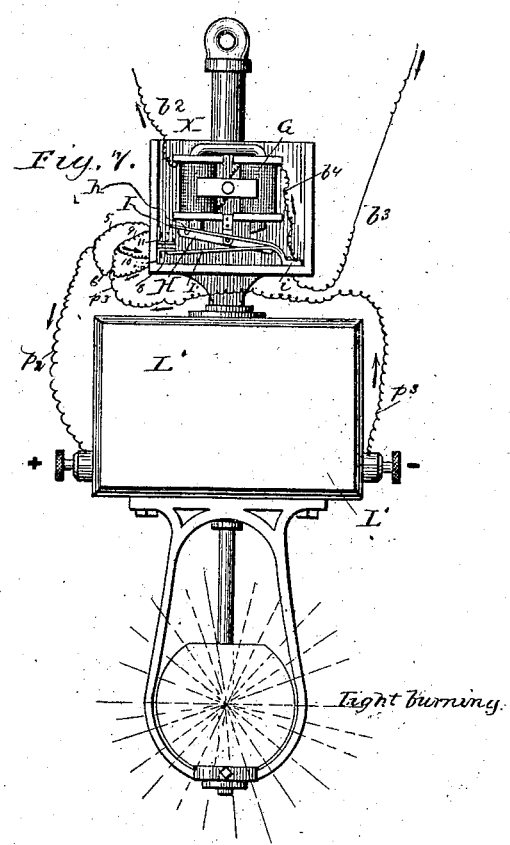
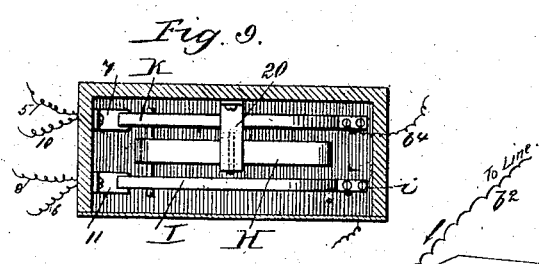
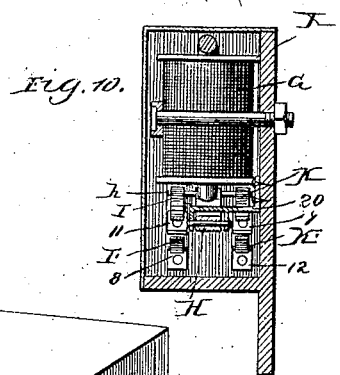
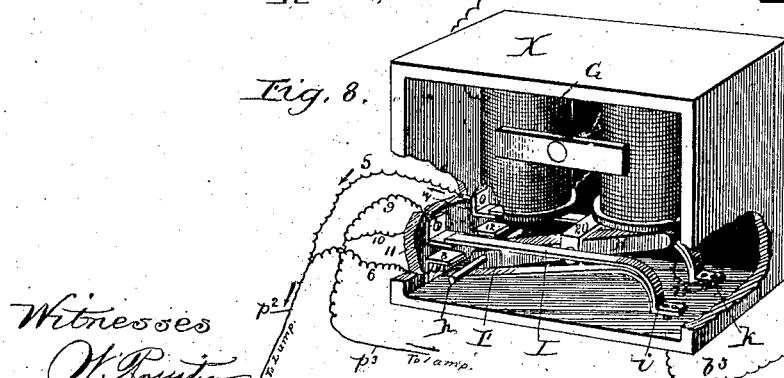
Witnesses
W. Rossiter
F. H. Mills.
Inventor
Frank L. Perry
By Prim & Fisher
His Attys.
THE ECKERT LITHOGRAPHING CO., WASHINGTON, D. C.

UNITED STATES PATENT OFFICE.

FRANK L. PERRY, OF CHICAGO, ILLINOIS.

SYSTEM OF ELECTRICAL DISTRIBUTION.

SPECIFICATION forming part of Letters Patent No. 408,513, dated August 6, 1889.

Application filed August 27, 1888. Serial No. 283,904. (No model.)

*To all whom it may concern:*

Be it known that I, FRANK L. PERRY, a citizen of the United States, residing at Chicago, in the county of Cook and State of Illinois, have invented certain new and useful Improvements in Systems of Electrical Distribution, of which I do declare the following to be a full, clear, and exact description, reference being had to the accompanying drawings, forming part of this specification.

In the accompanying drawings and the subjoined description my invention is particularly set forth as applied to an electric light and power system, although it will be readily understood that the invention is applicable in whole or in part to other systems of electrical distribution in which translating devices are employed at various points to utilize the electric current.

In electric-lighting systems it is now a common practice to include in the same circuit with the lamps electric motors deriving their power from the same dynamo-electric machines that supply current to the lamps. The lamps are connected either directly with the main circuit, or, as is frequently the case, a series of lamps are connected by a loop or branch deriving current from the main circuit. As it often happens that the electric motors are to be run at times—as, for example, during the day-time—when it is not desired to burn the lights, it would be necessary either to run the lamps along the motors or for an attendant to visit the various stations when the lights are to be extinguished, in order to cut them out of circuit and again to place them in circuit when they are to be burned.

My present invention has for its object, first, to provide means whereby lamps or other devices utilizing main current may be thrown into or out of circuit from a central station by the mere reversal of current in the main circuit; and a further object of my invention is to provide means whereby current will be passed in one direction only through certain lamps or other translating devices utilizing current in order that such lamps or devices will be unaffected by the reversal of current in the main circuit.

Figure 1 is a diagram showing a single arc-light circuit with two arc lamps and an electric motor included therein, current being in such direction that the motor is in operation and one of the lamps is out of and the other is in circuit. Fig. 2 is a diagram similar to Fig. 1, but showing both the lamps and motor in circuit. Fig. 3 is an enlarged view of my electro-magnetic circuit-switching device. Fig. 4 is a view similar to Fig. 3, but with the armature in reversed position. Fig. 5 is a view in vertical section through the end of the casing, which in practice will be employed to inclose the electro-magnet and its armature. Fig. 6 is an enlarged view of a single arc lamp, my improved mechanism for causing the flow of current in uniform direction through said lamp being shown in elevation and in position above the lamp. Fig. 7 is a view similar to Fig. 6, but showing the parts in position assumed when current is sent in the direction reverse of that shown in Fig. 6. Fig. 8 is a perspective view, on an enlarged scale, of my improved mechanism for preventing the reversal of current in the lamp or other device. Fig. 9 is a view in horizontal section through Fig. 8, the section being taken just below the electro-magnet. Fig. 10 is a view in central vertical transverse section through Fig. 8.

I will first describe that part of my present invention whereby the cutting out of a lamp or other electrical translating device utilizing current can be effected by the reversal of current in the main circuit.

A designates the dynamo-electric machine from which current is sent over circuit-wire $b$, that may contain any desired number of electric motors M and lamps L and L'. When my invention is to be applied to an individual lamp, the main-circuit wire $b$, instead of connecting directly with the binding-posts of the lamp, will connect with an electro-magnet D, through which current will pass at all times. From this magnet D leads a portion $a'$ of the main-circuit wire that connects with one pole $p$ of the lamp, and with the opposite pole $p'$ of the lamp connects the section $a^2$ of the main-circuit wire. Around the lamp and connected with the poles thereof extend the sections S and S' of the shunt-wire, and ends of these sections leading to suitable binding-posts $r$ and $r'$, arranged in proximity to the pivoted armature T of the electro-magnet. Upon the end of this armature T is carried a bridge-piece $t$, of suitable conducting material, so that when the armature is in the position shown in Figs. 1 and 3 the sections S and S' of the shunt-wire will be practically united for passage of current. This bridge-piece $t$ is, by preference, loosely held on the end of the armature T, by means of set-screw $t'$, in order to permit the bridge-piece to more readily adjust itself to contact with the binding-posts at the ends of the shunt-wire sections.

The electro-magnet D is preferably wound in such manner that its terminals shall be of like polarity, and, by preference, also, the armature is a polarized magnet with terminals of opposite polarity, so that when current is sent from the dynamo-electric machine in one direction to produce corresponding polarity in the electro-magnet the ends of the polarized armature will be correspondingly attracted or repelled. Thus, for example, by reference to Figs. 1 and 3 of the drawings it will be observed that current is passing through the main circuit in such direction as to give positive polarity to the electro-magnet, and consequently the negative pole of the polarized armature will be attracted and the positive pole repelled in such manner as to cause the bridge-piece at the opposite end of such armature to connect the binding-posts at the ends of the sections S and S' of the shunt-wire. It is plain that under such conditions current passes through the main circuit through the shunt-wire around the lamp and through the electro-magnet, so that the lamp will at such time be cut out. If now it is desired to burn the lamp, it is only necessary to reverse current in the main circuit, which can be conveniently done by changing the main-circuit wires at the dynamo, as seen in Fig. 2. Under this new condition, as seen in Figs. 2 and 4, the polarity of the magnet is reversed, and the positive pole of the polarized armature T being attracted and the negative pole being repelled the bridge-piece $t$ is lifted, so as to break connection between the sections S S' of the shunt-wire, and hence at such time, as shown by the arrows in Figs. 2 and 4, current will pass through the main-circuit wire through the electro-magnet, and thence through the lamp and main-circuit wire. It will therefore be seen that when it is desired either to throw the lamp into or out of circuit it is only necessary to reverse the direction of current in the main circuit. As electric-motors work in the same manner and without changing the direction of rotation irrespective of the direction of current, it is obvious that the reversal of current is immaterial so far as these are concerned.

For convenience I have shown the main-circuit wire $b$ as connected to the same insulator F that sustains the section $a'$ of the main-circuit wire; but it will be understood, of course, that this is merely a matter of convenience.

While my improved switch mechanism for cutting lamps or other devices out of circuit is shown as applied in Figs. 1 and 2 to an individual lamp, it will be readily understood that it may be employed for cutting out loops upon which any number of lamps are carried. So, also, it is apparent that my invention is applicable in like manner to cutting out a lamp or series of incandescent lamps and for cutting out other electrical translating devices utilizing current of main circuit.

While I have illustrated what I regard as the preferred form of electro-magnetic switch device for carrying out my invention, I do not wish my invention to be understood as restricted thereto, since to the skilled electrician will readily occur many modifications and details of constructions—such, for example, as the obvious ones of changing the shape or character of the magnet and of the armature, or of pivoting the magnet instead of the armature, or of the use of a small electric motor with permanent field-magnets.

As it is frequently desirable that certain lamps or other devices utilizing current included in the main circuit shall continue to operate while others are out of operation, I have provided improved means whereby a uniform direction of current through such lamps or other devices shall be retained irrespective of the reversal of current made in the main circuit for the purpose of cutting out other lamps or devices. This improved mechanism is shown as applied to the lamps designated as L' in the several figures of the drawings. The binding-posts $p$ and $p'$ of each of these lamps L' are provided with suitable wires $p^2$ and $p^3$, the terminals of which wires are thrown into proper connection with sections $b^2$ and $b^3$ of the main-circuit wires by means of a suitable switch appliance having an electro-magnet and its armature as part thereof, and operating in such manner that the passage of current is maintained in the lamp irrespective of change in direction of current through the main-circuit wires. In the embodiment of my invention illustrated in the drawings the wire $p^2$, that connects with the positive pole or binding-post $p$ of the lamp, is provided at its opposite end with the branch wires 5 and 6, that connect with the terminals 7 and 8, affixed to the side of the main casing X, that serves to inclose the mechanism, and in like manner the wire $p^3$, that leads from the negative pole or binding-post $p'$ of the lamp, is provided at its opposite end with branch wires 9 and 10, leading to the terminals 11 and 12 within the casing X. Within the casing X is sustained the electro-magnet G, connected in main circuit by wires $b^2$, $b^3$, and $b^4$ and the double bridge-piece, this magnet being preferably wound in such manner as to give like polarity to both its poles, and beneath this magnet is pivotally mounted upon the bracket 20 the polarized armature H, having poles of opposite polarity, so that when current is passing through main circuit and magnet G in one direction one pole of armature H will be attracted and the opposite pole repelled, and when the direction of current in main circuit is reversed, thereby changing the polarity of the electro-magnet, a corresponding reverse effect upon the armature will be had.

Within the casing X is held the bridge-piece, which when shifted by the armature serves to maintain uniform direction of current through the lamp, and in the form illustrated this bridge consists of two sets of spring-arms I and I' and K and K'. The bent rear ends of the arms I and I' are fastened, as at $i$, to the bottom of the casing X, and there connect with the section $b^3$ of the main-circuit wire, and in like manner the arms K and K' are fastened, as at $k$, to the bottom of casing X, and are there connected with the section $b^4$ of the main-circuit wire. The upper arms I and K are adapted to rest upon the terminals 11 and 7, respectively, and the lower arms I' and K' are adapted to bear respectively against the under side of the terminals 8 and 12. Between the upper arms I and K and lower arms I' and K' extends the push-bar $h$, of suitable non-conducting material, this push-bar being preferably passed through a hole in the end of the armature H, so as to move therewith and enable the armature to properly shift the bridge.

From the foregoing description it will be seen (referring particularly to Figs. 6 and 8 of the drawings) that current is passing through section $b^2$ of the main circuit, through the electro-magnet, thence through section $b^1$ of the main circuit, thence through spring-arm K, thence through terminal 7 and section 5 of the wire $p^2$ to the positive pole $p$ of the lamp, and from the negative pole of the lamp current is passing through wire $p^3$, branch wire 9, terminal 11, and spring-arm I, to the sections $b^3$ of the main circuit; and it will be seen that when current is thus passing the electro-magnet will be given such polarity as to hold the polarized armature H in the position shown, so that the push-bar $h$ at the end of this armature will depress the arms I' and K' out of contact with the terminals 8 and 12, and hence it is evident that there is no outlet for current save that above indicated. If now current in the main circuit be reversed for the purpose of throwing the lamps L out of circuit, the magnet G will no longer serve to depress the push-bar $h$ and the armature H, and consequently the spring-arms I' and K' will bear against the under side of the terminals 8 and 12, and the current being thus reversed a correspondingly-reversed polarity will be given to the magnet G, so that the opposite end of the armature H will be lifted, thus serving to withdraw the spring-arms I and K from contact with the terminals 7 and 11; hence it will be seen that under this new condition current will now pass through sections $b^3$ of the main circuit, through the lower spring-arm I' and terminal 8 to the branch wire 6 of the wire $p^2$, and through this wire to the positive pole $p$ of the lamp, and from the negative pole of the lamp current will pass through the wire $p^3$, the branch wire 10, the terminal 12, and lower spring-arm K' to the section $b^4$ of the main circuit, and thence through the electro-magnet G to the section $b^2$ of the main circuit.

It is also obvious that while current is thus passing the armature H and its push-bar $h$ is holding the spring-arms I and K lifted out of contact with the terminals 7 and 11, so that the only outlet for current is in the manner last defined. In arc-light and power circuits it is of importance that when current is reversed no actual break should occur, as under such condition there would be danger of forming an arc, and consequently burning the terminals, and it is for this reason in such cases that I prefer to employ a double bridge-piece—such, for example, as that above described—in which, when current is to be reversed, one set of connections shall be established before the opposite is broken.

It will be readily understood that my invention is applicable to a variety of other uses than those specifically stated, and that various modifications in details of construction may be employed without departure from the spirit of the invention.

While the form of electro-magnetic switch shown for throwing lamps or other devices utilizing current into and out of circuit differs in function, and somewhat in construction also, from the form of electro-magnetic switch shown for maintaining a uniform passage of current through a lamp or other device, irrespective of the reversal of current in main circuit, it will be seen that both constructions possess alike the novel feature of an electro-magnet interposed in the main circuit and an armature, said magnet and armature serving to move a suitable connecting-piece, whereby the passage of main current through certain conductors can be determined by the reversal of current in the main circuit; and it will be seen, also, that both constructions possess the novel feature of an electro-magnet wound to give poles of like polarity, combined with a polarized armature that serves to control a suitable connecting piece or bridge that directs the passage of current.

Having thus described my invention, what I claim as new, and desire to secure by Letters Patent, is—

1. The combination, substantially as set forth, of a single main-line circuit having various devices for electrical translation connected up therewith, and a station-switch in connection with any such device or a group thereof to automatically control the electrical supply thereto by reversal of the line-current, the same comprising an electro-magnet closed to line and having terminals of like polarity, an isolated polarized armature in the field thereof, and a bridge-piece controlled by said armature to make and break the line-connection of the translating device or group.

2. The combination, substantially as set forth, of a single main-line circuit having various devices for electrical translation connected up therewith, and a station-switch in connection with any such device or a group thereof to automatically control the electrical supply thereto by reversal of the line-current, the same comprising an electro-magnet closed to line and having terminals of like polarity, an isolated polarized armature pivoted in the field thereof, and a bridge-piece controlled by said armature to make and break the line-connection of the translating device or group.

3. The combination, substantially as set forth, of a single main-line circuit having various devices for electrical translation connected up therewith, and a station-switch in connection with any such device or a group thereof to automatically determine the electrical supply thereto under reversal of the line-current, the same comprising an electro-magnet closed to line and having terminals of like polarity, a polarized armature in field thereof, and double bridge-pieces actuated alternately by shift of said armature to respectively make and break the dual terminal connections of the translating device or group with the main-line circuit.

4. The combination, substantially as set forth, of a single main-line circuit having various devices for electrical translation connected up therewith, and a station-switch in connection with any such device or a group thereof to automatically determine the electrical supply thereto under reversal of the line-current, the same comprising an electro-magnet closed to line and having its wire coils wound to form terminals of like polarity, an isolated polarized armature pivoted in the field of said magnet, and a bridge-piece shifting with said armature to make and break the line-connection of the translating device or group.

5. The combination, substantially as set forth, of a single main-line circuit having various devices for electrical translation connected up therewith, and a station-switch in connection with any such device or a group thereof to automatically control the electrical supply thereto by reversal of the line-current, the same comprising an electro-magnet included in the main circuit and having terminals of like polarity, a polarized armature in the field thereof, and a bridge-piece controlled by said armature to make and break the line-connection of the translating device or group.

6. In a system of electrical distribution, the combination, with a single main-line circuit, of a switch appliance connected up therewith to automatically determine the direction of electrical supply under reversal of the line-current, the same comprising an electro-magnet included in main circuit, and having terminals of like polarity, a polarized armature in the field thereof, and a bridge-piece controlled by said armature to change the direction of the main current, substantially as described.

FRANK L. PERRY.

Witnesses:
GEO. P. FISHER, Jr.,
J. B. CARPENTER.